United States Patent
Steblay

[15] 3,659,514
[45] May 2, 1972

[54] FILM TRANSPORT RACK

[72] Inventor: Ralph E. Steblay, Redlands, Calif.

[73] Assignee: Phototron Co., Rialto, Calif.

[22] Filed: Oct. 23, 1970

[21] Appl. No.: 83,464

[52] U.S. Cl. ............................ 95/94 R, 95/89 A, 226/11, 226/195, 242/55.0, 242/56.9, 242/67.1
[51] Int. Cl. ........................................................ G03d 3/12
[58] Field of Search .................. 95/89 R, 89 A, 94 R, 100; 226/11, 195; 242/55.0, 67.1, 56.9

[56] References Cited

UNITED STATES PATENTS

| | | | |
|---|---|---|---|
| 3,521,544 | 7/1970 | Good | 95/94 R |
| 2,244,170 | 6/1941 | Miketta et al. | 95/94 R X |
| 1,998,154 | 4/1935 | Burns | 95/94 R |
| 2,162,016 | 6/1939 | Howell | 95/94 R |

Primary Examiner—Samuel S. Matthews
Assistant Examiner—Fred L. Braun
Attorney—Mellin, Moore & Weissenberger

[57] ABSTRACT

Apparatus for developing film including a shaft rotatably mounted in a film transport rack. The rack includes a film reel loosely mounted on the shaft for rotation therewith when the reel is held against the shaft by film disposed therearound under tension. A stationary brake is associated with the rack for braking the film reel into a stationary position with respect to the shaft independent of the rotation of the shaft when film tension is released from the film reel.

10 Claims, 4 Drawing Figures

Patented May 2, 1972
3,659,514
2 Sheets-Sheet 1
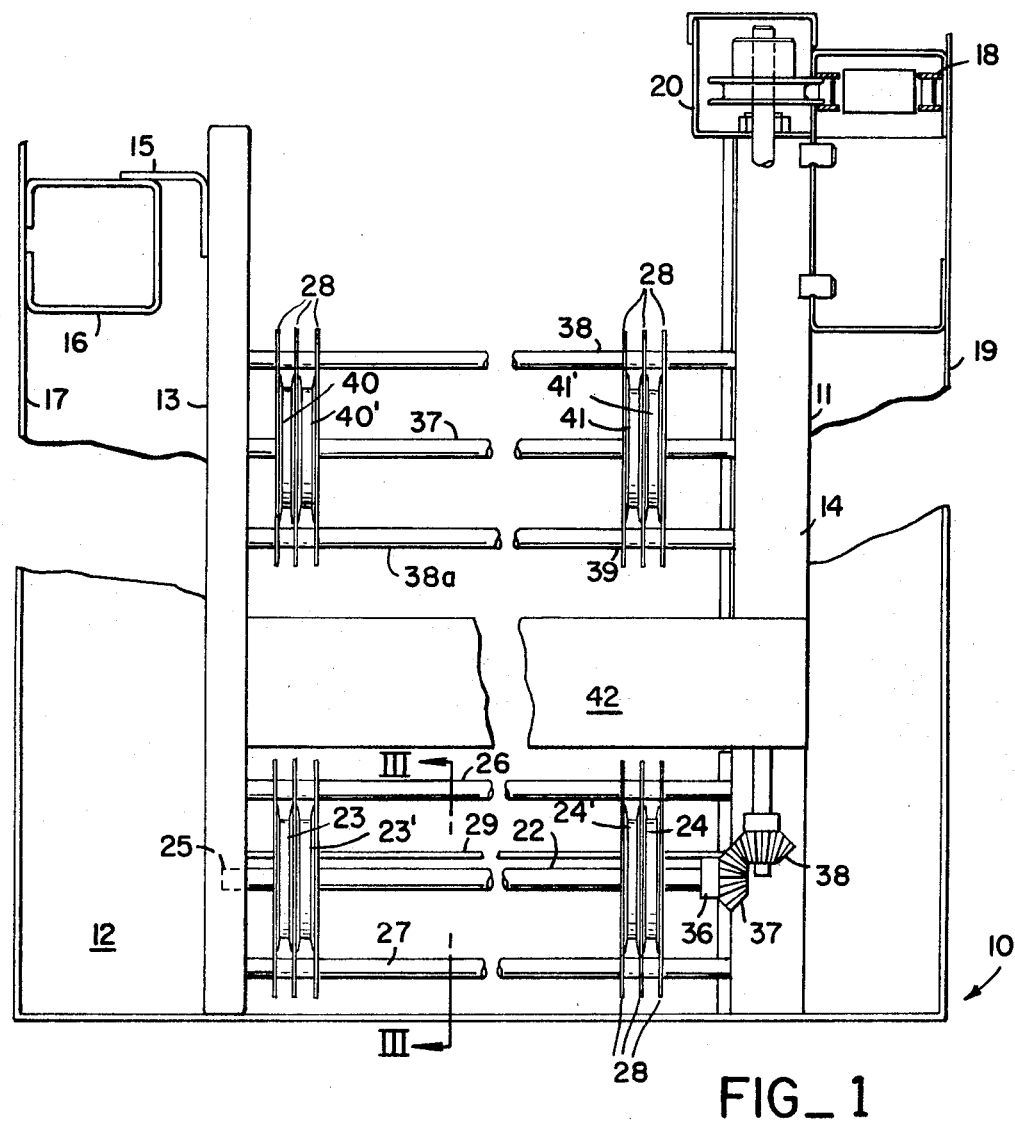
FIG_1
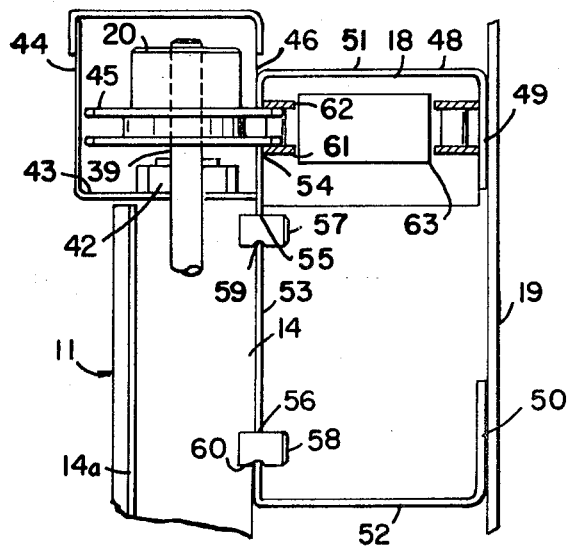
FIG_2
INVENTOR.
RALPH E. STEBLAY
BY
Mellin, Moore & Weissenberger
ATTORNEYS

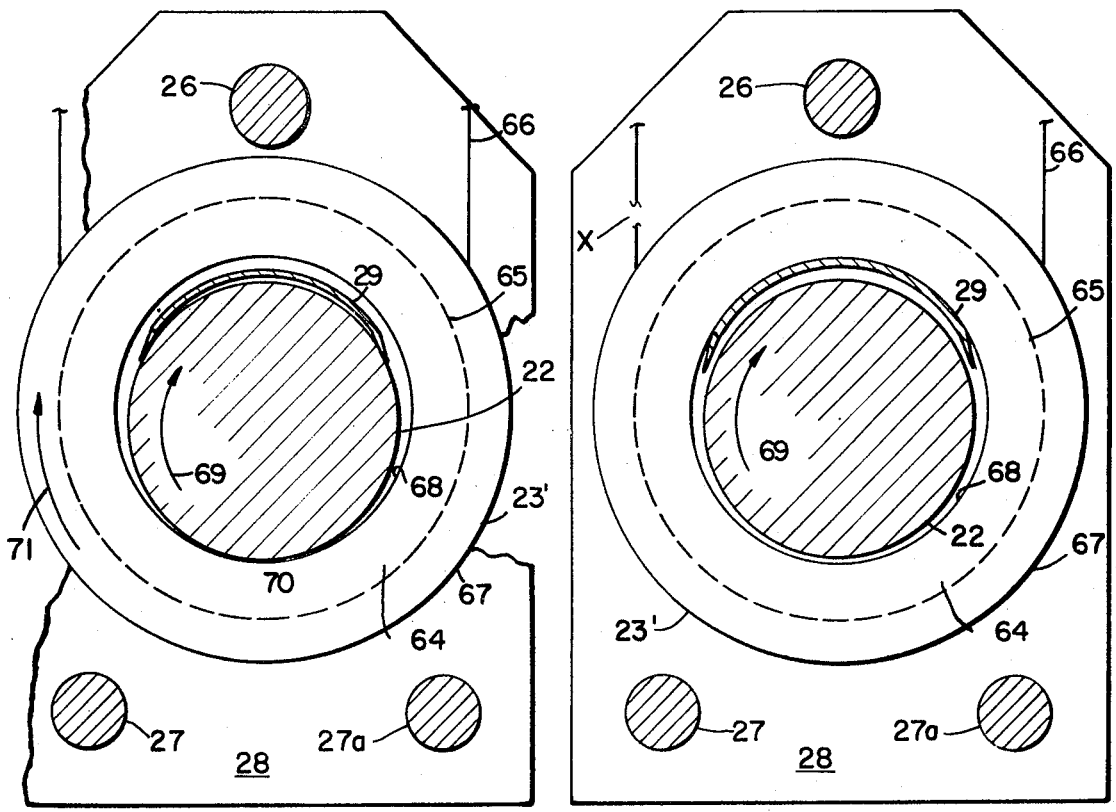

FILM TRANSPORT RACK

BACKGROUND OF THE INVENTION

1. Field of the Invention

The invention relates to the developing of film; and, more particularly, to apparatus for developing film whereby a film reel transport rack includes means for preventing the spilling of film during the film developing process.

2. Description of the Prior Art

It is known in the film developing art to dispose a film transport rack within a film developing bath during the developing process. Such racks include a plurality of rotatable reel holders which, upon rotation, take film from supply reels and pass the film through a developing bath. The reel holders generally are loosely disposed on shafts journalled on the film transport rack which shafts are rotated through suitable rotating means. The film to be developed extends from the supply reels about the reel holders and is maintained under tension, thus holding the reel holders against the shafts for rotation therewith. However, should the film break or the reel holders be otherwise released from tension, the reel holders continue to rotate thus spilling film disposed therearound throughout the developing bath resulting in possible damage to the film and breakdown in the film developing process.

Certain techniques are known in the prior art for offsetting such film spillage. For example, a rubber ring or the like may be loosely disposed in the space between the reel holder and the shaft and in contact with the shaft when the reel holder is under tension. If tension is released from the reel holder, the loose rubber ring serves as a slow-down or braking device for the reel holder. However, upon reengagement of the shaft by the ring, the reel holder may again be driven by the shaft through the ring. In like manner, a similar prior art device provides a spring connected to both the reel holder and the shaft. When the film holder is held substantially taut by the film under tension, the spring is tensioned in the space formed between the reel holder and the shaft. When the film is no longer under tension, the reel holder slackens and the spring is released from tension thus acting as a brake to slow down the reel holder. However, the tension of such springs is extremely critical making it both difficult and costly to manufacture such springs and replace them after relatively short periods of use, especially in the corrosive environment of a film developing bath.

SUMMARY OF THE INVENTION

It is an object of this invention to provide apparatus for developing film whereby a rack disposed in a developing bath includes means thereon for preventing film spillage due to slackening in tension of the film being developed.

It is a still further object of this invention to provide a film transport rack having such film spillage prevention means thereon.

These and other objects are preferably accomplished by disposing a film transport rack in a film developing bath, the rack including rotating means for driving a shaft on the rack, the shaft having at least one film reel loosely mounted. Upon actuation of the rotating means, the shaft rotates, takes film from film supply reels, and passes the film carried thereby through the developing bath.

The loosely mounted film reel is held against the shaft for rotation therewith through the tension of the film. A stationary brake is associated with the rack for braking the film reel into a stationary position with respect to the shaft independent of the rotation of the shaft when film tension is released from the film reel.

BRIEF DESCRIPTION OF THE DRAWING

FIG. 1 is a vertical view of preferred apparatus for carrying out the techniques of my invention;

FIG. 2 is a vertical sectional view of a portion of the apparatus of FIG. 1;

FIG. 3 is a sectional end view of a portion of the film transport rack of the apparatus taken along lines III—III of FIG. 1; and FIG. 4 is a sectional view similar to FIG. 2 showing the film take-up reel in braking position on the film transport rack of FIG. 1.

DESCRIPTION OF THE PREFERRED EMBODIMENT

Referring now to FIG. 1 of the drawing, a film developing bath 10 is shown having a film transport rack 11 disposed therein in contact with a chemical developing solution 12 in bath 10. Rack 11 preferably includes a pair of side supports 13 and 14 with an outwardly extending L-shaped flange 15 disposed on the upper end of one of the supports (for example, support 13). Bath 10 preferably includes an inwardly extending abutment member 16, in the general form of a U-shaped flange on sidewall 17, at its upper end. Side support 14 includes a housing 18 adapted to act as both a spacer for rack 11 and provide drive means for the film transport rack 11, as will be discussed further hereinbelow with respect to FIG. 2.

Side support 14 of rack 11 includes rotating means 20 at its upper end adapted to engage the drive means within housing 18. The particular details of the rotating means 20 and the associated drive means will also be described in detail further hereinbelow. For purposes of explanation of the apparatus of FIG. 1, it is to be understood that, when rack 11 is suspended in bath 10 by means of flange 15 engaging member 16, the rotating means 20 engages the drive means in housing 18. The rotating means 20 operatively engages a film reel support shaft 22 which is rotatably mounted between side supports 13 and 14 of rack 11 as will be further discussed hereinbelow. A plurality of film reels, four (reels 23, 23$^1$, 24, and 24$^1$) being shown for convenience of illustration, are loosely mounted on shaft 22. A stationary brake member 29 is mounted between supports 13 and 14 as will be discussed further hereinbelow. Shaft 22 is preferably journalled in an aperture 25 in side support 13. A rod 26 is disposed above shaft 22 while a pair of spaced rods 27 and 27a (FIG. 4) are disposed below shaft 22. A plurality of film guide plates 28 (see particularly FIG. 4) are disposed on the bars 26, 27 and 27a adjacent the film reels 23, 23$^1$, 24, and 24$^1$, as shown. These plates serve to maintain the film in position on the reels. For convenience of illustration, the film extending between the film reels on shaft 22 (and the supply reels as will be discussed further hereinbelow) has been omitted in FIG. 1.

Gearing means 36 is disposed at the end of support bar 22 opposite side wall 13. Gearing means 36 includes a bevel gear 37 adapted to engage mating bevel gear 38 connected to shaft 39 within side support 14 as will be discussed further hereinbelow. In this manner, when shaft 22 is locked into engagement with aperture 25 in side support 13 and bevel gear 37 engages mating bevel gear 38 in side support 14, upon actuation of the bevel gear 38 through shaft 39, shaft 22 is rotated, thus rotating reels 23, 23$^1$, 24 and 24$^1$. Reels 23, 23$^1$, 24 and 24$^1$ are held in tension with respect to shaft 22 by the film passing therearound so that they rotate therewith as will be discussed further hereinbelow.

The upper portion of film transport rack 11 is as follows. A film reel supply support bar 37 is supported or otherwise secured between side walls 13 and 14 as discussed hereinabove with respect to bars 26 and 27. A plurality of film supply reels, four (reels 40, 40$^1$, 41, and 41$^1$) being shown for convenience of illustration, are disposed on support bar 37 and rotatable with relation thereto. Film guide plates 28 are also disposed on bars 38 and 27a, similar to guide bars 26, 27 and a (the third bar not visible behind bar 38a). A suitable cross-brace 42 may extend between and be secured to side supports 13 and 14 for bracing the film transport rack 11. Although a particular number of supports and support bars are shown, together with a suitable length thereof and height of the apparatus, obviously such elements may be relatively long in length and the height thereof may be any desired height in accordance with the teachings of my invention.

In operation, upon rotation of shaft 22, film (not shown) is taken from supply reels 40, 40¹, 41, and 41¹ and passed to take-up reels 23, 23¹, 24, and 24¹ for developing the film within solution 12 in bath 10.

Shaft 39 extends longitudinally of and within the side support 14 which may either be hollow for such purpose or be solid and have a suitable opening formed therein. Thus, suitable means (not shown) may be disposed within the interior of support 14 for supporting shaft 39 for rotating motion.

Referring now to FIG. 2, wherein like numerals refer to like parts of FIG. 1, the upper end of shaft 39 passes through a bushing 42 mounted on the bottom wall 43 of a housing 44 which supports rotating means 20. Rotating means 20 preferably includes a generally horizontally disposed sprocket having teeth 45 extending transverse to the axis of shaft 39. Teeth 45 are fixedly secured to shaft 39 so that rotation of teeth 45 is transmitted to shaft 39. An aperture 46 is disposed in the side wall 47 of housing 44 adjacent the side wall 19 of bath 10 (see also FIG. 1). Teeth 45 are so disposed in housing 44 that a substantial portion thereof pass out of aperture 46.

The housing 18 will now be described in detail. Housing 18 may take the form of a C-shaped flange having short vertical portions 49 and 50 secured to side wall 19 of bath 10 by any suitable means. Horizontal portions 51 and 52, integral with portions 49 and 50, space rack 11 a suitable distance from side walls 17 and 19 of bath 10 so as to allow for sufficient manipulation of rack 11 within bath 10 as will be discussed further hereinbelow. A generally vertically extending portion 53 is integral with horizontal portions 51 and 52. Portion 53 has a number of apertures therein, as for example, apertures 54 through 56. A pair of nubs 57 and 58 are preferably integral with the side support 14 of rack 11. Nubs 57 and 58 are generally of a lesser diameter than apertures 55 and 56 and include indentations 59 and 60, respectively, on the bottoms thereof. In this manner, nubs 57 and 58 may be inserted within apertures 55 and 56 until indentations 59 and 60 engage the adjacent portions of vertical flange portion 53, thus locking rack 11 in position in bath 10. Simultaneously, teeth 45 enter aperture 54 and contact the links 61 of a chain 62 which is suitably supported by a block 63 secured to flange portions 48, 49 and 53. In other words, in FIG. 2, only the end view of chain 62 is shown, it being understood that a single chain 62 may be used to drive a plurality of racks 11 aligned with chain 62, all of the racks being disposed in one or more baths 10. Block 63 may include suitable guide means thereon (not shown) for guiding chain 62 from one station (i.e. one rack 11) to another. Further, it is also to be understood that chain 62 may be driven by any suitable means, as for example, by being passed about a horizontally disposed sprocket connected to the shaft of a motor (not shown). Of course, chain 62 may also be manually driven, if desired, by manually rotating a sprocket (not shown) engaging chain 62.

It can be seen from the foregoing that the indentations 59 and 60 on nubs 57 and 58 permit the rack 11 to be easily engaged and disengaged from housing 18 and from contact with member 16 (see also FIG. 1). However, such an arrangement provides positive engagement of gear teeth 45 with chain 62 or any suitable drive means for teeth 45 within housing 18. Upon application of suitable motive means to chain 62, shaft 39 rotates and bevel gear 38 drives bevel gear 37 on film reel support shaft 22, thus rotating shaft 22.

Referring now to FIGS. 3 and 4 where again like numerals refer to like parts of FIG. 1, an end view of one of the film take-up reels, that is, reel 23¹, and shaft 22 is shown, portions of FIG. 1 being omitted for convenience of illustration. Reel 23¹ is in the general form of a spool 64 having a groove 65 (shown in dotted lines) for receiving the film 66 therearound. Reel 23¹ also includes a flange portion 67 for keeping the film 66 on the spool. Film guide members 28, as can also be seen in FIG. 1, prevent film 66 from jumping out of the groove 65. Spool 64 also includes a generally circular axial hole 68 through which shaft 22 is disposed. As can be seen, hole 68 is slightly greater in diameter than the cross-sectional diameter of shaft 22.

Brake member 29 is in the general form of an elongated arcuate plate conforming in configuration generally to the circular configuration of the axial hole 68 and may be of steel or similar metal. As seen in FIG. 3 member 29 may be slightly less than about one-half the circumference of hole 68; i.e., of a slightly lesser radius than of hole 68.

In operation, with film 66 passed around the groove 65 of spool 64, the reel 23¹ is under tension and pulled upwardly with respect to shaft 22 as can be seen in FIG. 3. As shaft 22 is rotated in the direction of arrow 69, because of the engagement of spool 64 at point 70 on the circumference of axial hole 68, rotation is transmitted to reel 23¹ which thus rotates therewith in the direction of arrow 71 thereby taking film from the film supply reels (FIG. 1) and passing said film into the developing bath 12 as discussed hereinabove. At this point as can be seen in FIG. 3, member 29 is spaced both from shaft 22 and the axial hole 68 of spool 64 so that rotation of the film reel 23¹ is not impeded.

Referring now to FIG. 4, assuming a break in film 66 has occurred, as for example, at point X, tension is released from reel 23¹ and the reel 23¹, because of the over-sized relationship of hole 68 with respect to shaft 22, moves downwardly with respect to shaft 22 which continues to rotate in the direction of arrow 69. The disengagement of reel 23¹ from shaft 22 stops its positive drive by shaft 22; however, the momentum imparted to reel 23¹ would normally cause the reel 23¹ to continue to rotate until it came to a stop thus spilling film through the developing bath 12. Therefore, in accordance with my invention, upon downwardly movement of reel 23¹, the upper portion of the axial hole 68 of spool 64 engages brake member 29 thus immediately braking and stopping the rotation of reel 23¹ independent of the rotation of shaft 22. It can be seen from the foregoing that a novel arrangement is disclosed herein for passing film about film take-up reels and through a developing bath and stopping the rotation of the film take-up reels upon release of film tension from the reels.

I claim as my invention:

1. Apparatus for developing film comprising:
   a film developing bath containing a film developing solution therein;
   a film transport rack disposed in said developing bath in contact with said solution therein, said rack comprising:
   a frame member;
   first film reel support means disposed on said frame member for supporting at least a first film reel thereon;
   second film reel support means disposed on said frame member remote from said first film reel support means for supporting at least a second film reel thereon, and in contact with said solution, said second film reel support means including a shaft having said second film reel mounted thereon for rotation therewith;
   rotating means associated with said shaft for rotating said shaft; and
   said second film reel support means including stationary brake means thereon spaced from said shaft and in non-contiguous relationship thereto for disengaging said second film reel from rotary engagement with said shaft in response to film tension being removed from said second film reel when film is disposed therearound under tension and braking said second film reel into a stationary position with respect to said shaft independent of the rotation of said shaft;
   said apparatus including drive means thereon adapted to engage said rotating means for rotating said shaft.

2. The apparatus of claim 1 wherein said stationary brake means includes an elongated member fixed to said frame member and extending longitudinally of said shaft and substantially along the top thereof, said elongated member being spaced from both said shaft and said second film reel when said second film reel includes film under tension disposed therearound.

3. The apparatus of claim 2 wherein said second film reel includes a generally circular axial hole through which said shaft is disposed and a spool portion around which said film is wound, said elongated member being an arcuate plate conforming at least over a substantial portion thereof in configuration generally to the circular configuration of said axial hole, said axial hole being substantially greater in diameter than the diameter of said shaft with said arcuate plate being disposed in the space formed between said axial hole and said shaft and curved downwardly toward said shaft.

4. The apparatus of claim 3 wherein the radius of said arcuate plate is slightly less than the radius of said axial hole so that, when said second film reel is mounted on said shaft without film under tension therearound, the upper portion of said axial hole contacts and generally conforms to said stationary arcuate plate so that said second film reel is independent of the rotation of said shaft.

5. The apparatus of claim 1 including film guide means associated with said second film reel support means for preventing disengagement of film wound about the spool portion of said second film reel.

6. A film transport rack comprising:
a frame member;
first film reel support means disposed on said frame member for supporting at least a first film reel thereon;
second film reel support means disposed on said frame member remote from said first film reel support means for supporting at least a second film reel thereon, said second film reel support means including a shaft having said second film reel mounted thereon for rotation therewith;
rotating means associated with said shaft for rotating said shaft; and
said second film reel support means including stationary brake means thereon spaced from said shaft and in noncontiguous relationship thereto for disengaging said second film reel from rotary engagement with said shaft in response to film tension being removed from said second film reel when film is disposed therearound under tension and braking said second film reel into a stationary position with respect to said shaft independent of the rotation of said shaft.

7. The film transport rack of claim 6 wherein said stationary brake means includes an elongated member fixed to said frame member and extending longitudinally of said shaft and substantially along the top thereof, said elongated member being spaced from both said shaft and said second film reel when said second film reel includes film under tension disposed therearound.

8. The film transport rack of claim 7 wherein said second film reel includes a generally circular axial hole through which said shaft is disposed and a spool portion around which said film is wound, said elongated member being an arcuate plate conforming, at least over a substantial portion thereof, in configuration generally to the circular configuration of said axial hole, said axial hole being substantially greater in diameter than the diameter of said shaft with said arcuate plate being disposed in the space formed between said axial hole and said shaft and curved downwardly toward said shaft.

9. The film transport rack of claim 8 wherein the radius of said arcuate plate is slightly less than the radius of said axial hole so that, when said second film reel is mounted on said shaft without film under tension therearound, the upper portion of said axial hole contacts and generally conforms to said stationary arcuate plate so that said second film reel is independent of the rotation of said shaft.

10. The film transport rack of claim 6 including film guide means associated with said second film reel support means for preventing disengagement of film wound about the spool portion of said second film reel.

* * * * *